Jan. 7, 1936.　　　A. BACK ET AL　　　2,026,928
CONTINUOUSLY VARIABLE CHANGE SPEED GEAR
Filed Jan. 3, 1934　　　4 Sheets-Sheet 1
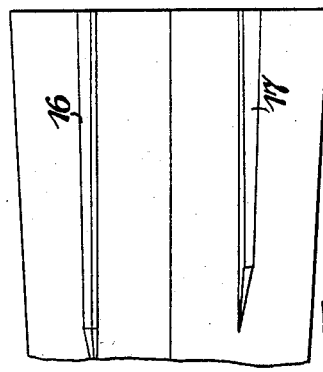
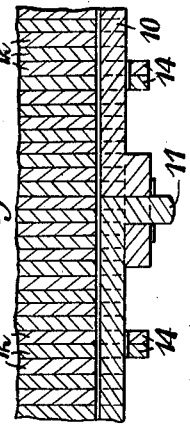
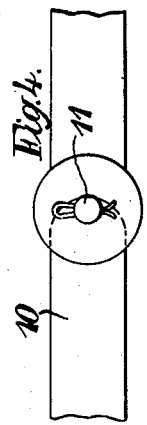
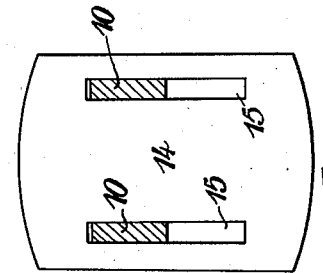
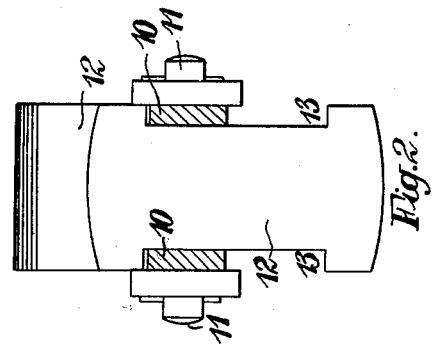
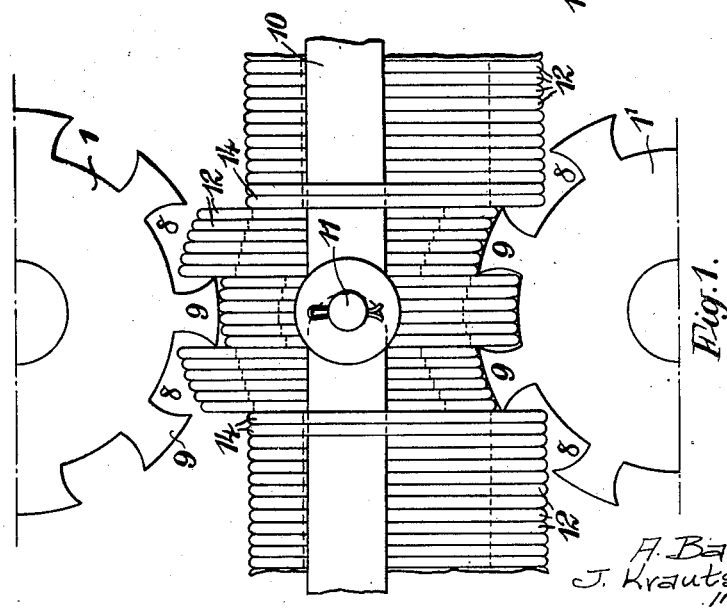

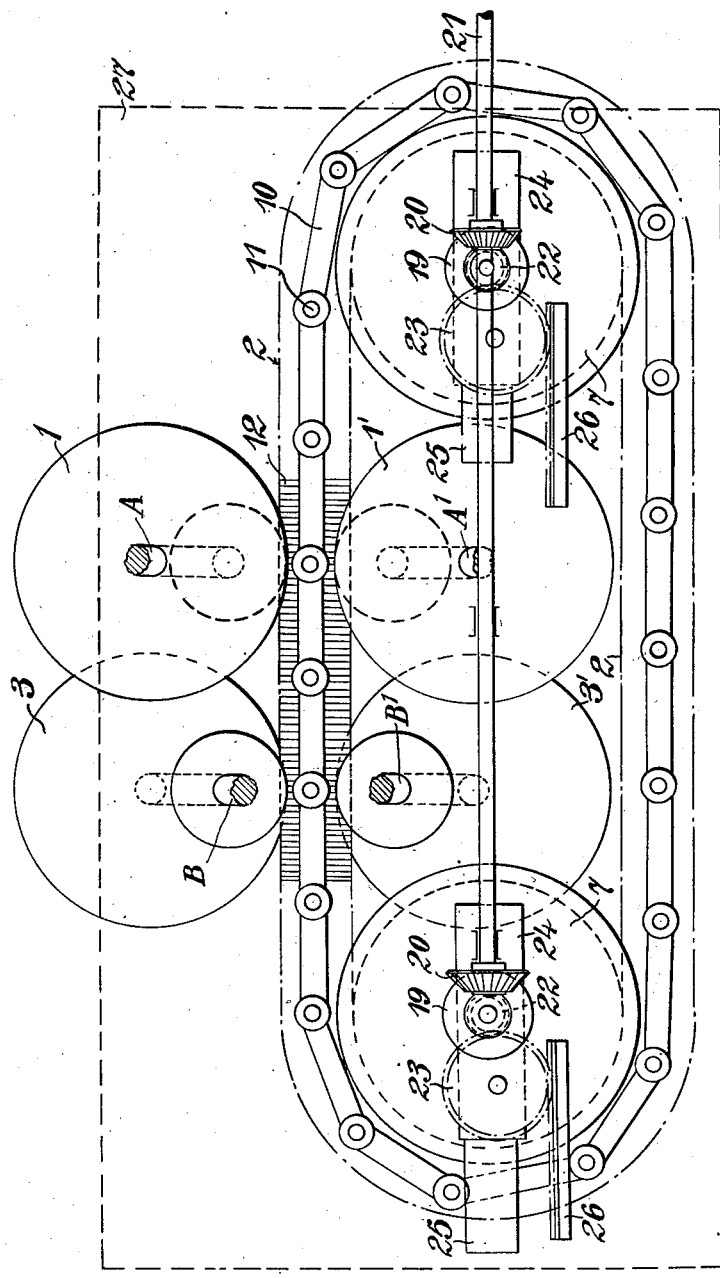

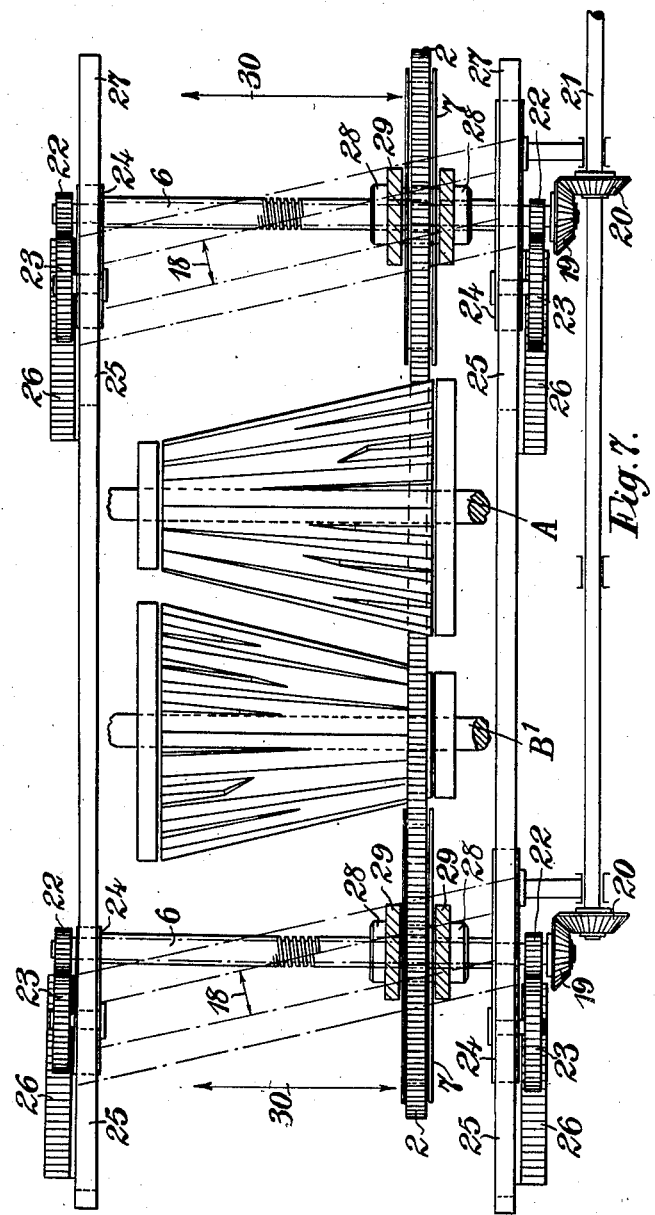

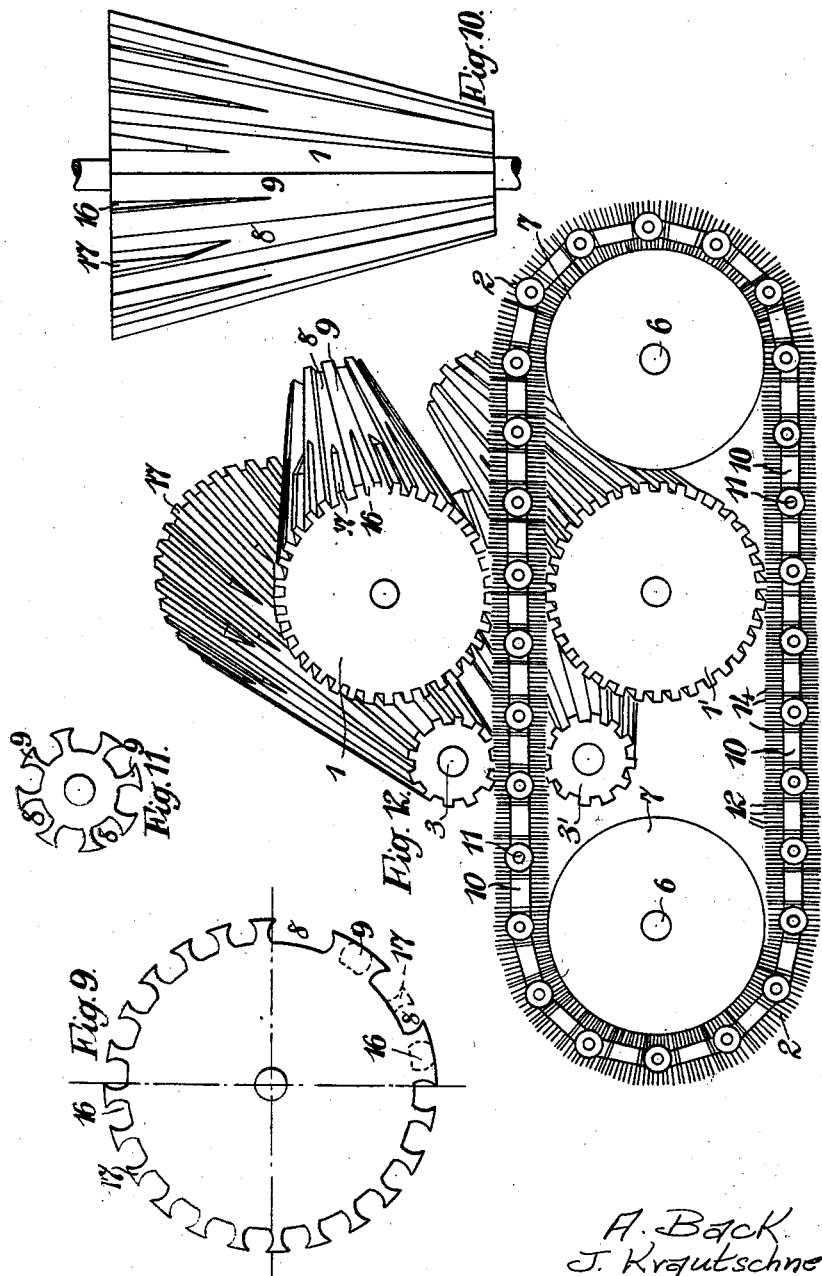

Patented Jan. 7, 1936

2,026,928

UNITED STATES PATENT OFFICE 2,026,928

CONTINUOUSLY VARIABLE CHANGE-SPEED GEAR

Alfred Back, Reichenberg, Czechoslovakia, and Josef Krautschneider, Hudson Bay Junction, Saskatchewan, Canada Application January 3, 1934, Serial No. 705,144 In Czechoslovakia March 17, 1932

4 Claims. (Cl. 74—217)

The object of the present invention is to provide a change-speed gear in which the transmission ratio can be adjusted at will, so that the variable power can be successively utilized in the most economical manner and the machine parts protected from undue stress or wear.

In the change-speed gears hitherto employed, in automobile vehicles for example, a number of so-called speeds are provided, which are changed in steps, this change only being made when the motor has reached the necessary speed of revolution.

By means of the present invention it is possible to adapt the speed to current requirements continuously instead of stepwise, so that adaptation to particular requirements can be smoothly and accurately effected. Thus there are no predetermined speeds, like the first, second and third speeds of a motor car, but any desired transmission ratio between the maximum and minimum limits provided can be employed as desired.

The kind of gear with cones between which a transmission member is displaceable is known with smooth transmission members.

With that kind the transmission ratio can also be adapted to the existing need. Only here the possibility of transmitting large forces is lacking.

This is rendered possible in the case of the present invention by the fact that the cones are constructed as toothed wheels, and as power-transmission means an intervening chain is employed of special construction, which can fit into the teeth from time to time.

In belt-pulley change-speed gears a similar chain has indeed also been employed, but never for the transmission of power with bevel wheels, and furthermore the known construction of transmission chain is not such as would cope with large actions.

This is effected in the case of the present invention by means of the chain construction hereinafter described.

The invention is illustrated by way of example in the accompanying drawings, in which Figure 1 shows in side elevation parts of two toothed wheels engaging one on each side of a transmission chain;

Figure 2 shows certain elements of the chain, partly in cross section,

Figure 3 shows part of the chain in sectional plan, and

Figure 4 shows in side elevation part of a guiding member which forms part of the chain.

Figure 5 is a section through the chain similar to Fig. 2, but showing an element of a different form.

Figure 6 shows in side elevation the general arrangement of the change-speed gear.

Figure 7 is a plan showing the general arrangement of the change-speed gear,

Figure 8 shows a detail of the surface of one of the toothed wheels employed.

Figure 9 is an end view of the larger end of a frusto-conical toothed wheel.

Figure 10 is a plan view of the same wheel, and

Figure 11 an end view of the smaller end thereof,

Figure 12 shows the change-speed gear diagrammatically in perspective.

In general the invention consists in constructing the driving wheels 1 and 1' and the driven wheels 3 and 3' as frusto-conical toothed wheels with their adjacent generating lines substantially parallel to one another, and employing for the transmission of power a special chain 2, which is displaceable along the parallel generating lines, and which is of such a construction that in any position it assumes on the side facing the tooth of a toothed wheel 1' for instance the form of a tooth space, which meshes completely with the said tooth, while on the side facing the other toothed wheel 1 the chain assumes the form of a tooth which engages accurately in the tooth space located there.

An alteration in the transmission ratio is hereby rendered possible without changing the positions of the toothed wheels relatively to one another, merely by displacing the chain; and the transmission of ample power is also rendered possible in any position, since the chain, by virtue of the shape that it assumes, transmits power from one toothed wheel to the other, just as if the wheels themselves were meshing with one another.

The details of the construction are as follows:—

The position of the bevel wheels 1 and 1' or 3 and 3' in relation to one another is such that where the transmission chain 2 passes through, the generating lines of the frusto-conical surfaces are parallel to one another. As shown in Figure 12, the chain 2 connects the individual frusto-conical wheels with one another and forms the transmission means from the driving wheels to the driven wheels. Now if the chain 2, by means of a lever or a motor for example, is slid from one end of the frusto-conical wheels to the other, the transmission ratio changes in proportion to the ratio between the diameters of the wheels at the position where they engage the chain. The arrangement for displacing the chain is illustrated by way of example in Figures 6 and 7.

In these figures, 6, 6 are screw spindles, one on each side of the group of frusto-conical toothed driving wheels 1, 1' and driven wheels 3, 3', which are mounted fast on driving shafts A and A' and driven shafts B and B' respectively. These screw spindles are journalled in bearing blocks 24, which can slide in guiding slots 25 in standards 27. The spindles can be rotated together by means of bevel toothed wheels 19, 19 mounted fast thereon, which mesh with bevel wheels 20, 20 mounted on a shaft 21, which is journalled in bearings carried by the blocks 24, and can be rotated either manually or by means of a motor. Through spur gearing diagrammatically represented by pinions 22, each of the spindles 6, 6 drives toothed wheels 23, each journalled in one of the bearing blocks 24. The toothed wheels 23 mesh with stationary racks 26, mounted on the standards 27. Consequently when the shaft 21 is rotated, the spur gears 23 travel along the racks 26 and the blocks 24 travel along the guiding slots 25, carrying with them the spindles 6, the shaft 21, the bevel wheels 19 and 20 and the spur pinions 22.

Upon an internally screw-threaded hub or sleeve 28 engaged upon each of the screw spindles 6 is mounted a bearing 29, which carries the guide pulley or chain wheel 7 for the chain 2. The sleeve 28 is prevented from rotating, and consequently when the spindle 6 is rotated by the shaft 21 the sleeve is constrained to travel along the spindle. The pitch of the screw spindles 6 is so related to the velocity ratio of the spur gearing 22, 23, 26 that whenever the shaft 21 is rotated the resultant movement of the chain wheels 7 is in a direction parallel to the adjacent generating lines of the frusto-conical toothed wheels, or, more precisely, in a direction parallel in each case to a tangential plane to the adjacent frusto-conical toothed wheels on the near side.

The sleeves 28 may if preferred engage with guides 18, shown in dot-and-dash lines in Figure 7. In this case the spur gears 22, 23 and the racks 26 may be omitted.

Alternatively the chain wheels 7 might be moved in the direction of the arrows 30, perpendicularly to the plane in which the chain 2 revolves. This would simplify the mechanism to some extent, but would take up a little more room and would require a rather longer chain.

The frusto-conical wheels are so constructed that a space 8 between the teeth of one wheel always faces a tooth 9 on the other wheel at the point of engagement with the chain, as shown in Figure 1. The motor drives one pair of frusto-conical toothed wheels 1, 1' and the chain 2 transmits the power to the other pair of frusto-conical toothed wheels 3, 3'. In order to render this transmission possible, the chain 2 is constructed in the following manner:— The chain 2 consists of two parallel guiding members 10, each of which consists of a plurality of flat links movably connected with one another by means of pivots 11. In between these two guiding members 10 are arranged a large number of thin plates 12, which are formed with lateral recesses 13, which are of such shape and dimensions that the plates can easily slide transversely to the direction of motion of the chain through a distance which is limited by the ends of the recess coming into contact with the guiding members 10, as shown more particularly in Figure 2.

In order to keep the guiding members 10 a constant distance apart, other thin plates 14 are arranged at suitable distances from one another between successive pivots 11, these plates 14 extending sideways beyond the guiding members 10, and thereby holding them together. They have slots 15 for the guiding members 10 as illustrated in Figure 5, by means of which they are made displaceable in the same manner as the aforementioned plates 12. The slots 15 in the plates 14 correspond to the recesses 13 in the plates 12.

If the plane of rotation of the chain 2 is vertical all the plates 12 and 14, as the chain 2 moves over a tooth 9 on one frusto-conical wheel 1' or 3', are displaced out of their normal position by the said tooth, and the opposite ends of these plates form a boundary line corresponding to the shape of the tooth 9 of the wheel on the other side of the chain. Since a tooth 9 on one wheel is always opposite to a space 8 between the teeth on the other wheel, the extruded plates 12 and 14 fit exactly into the spaces 8. The teeth 9 and the spaces 8 of the frusto-conical wheels 1 are of varying breadths, since they are formed on conical surfaces.

Although it might be obvious, by employing frusto-conical wheels with a sliding chain, to construct a gear in which the transmission ratio could be varied continuously at will, such an arrangement would be impossible so long as the displaceable transmission chain was not so constructed as to be able to adapt itself to the varying breadth of the teeth and spaces, or in other words, to the varying pitch of the teeth. Owing, however, to the fact that according to the present invention the number of thin plates 12 and 14 pushed out always corresponds to the breadth of one tooth 9, and therefore to the breadth of a space 8 on the opposite wheel, it is possible to adapt the arrangement to varying breadths of teeth or spaces, and therefore to employ frusto-conical wheels with a chain slidable between them.

It is clear from Figures 8, 9, 10 and 11 that in order to obviate the spaces 8 being too wide towards the large end of the frusto-conical surface, auxiliary spaces 16 and auxiliary teeth 17 are provided. In Fig. 9, round three-quarters of the circumference, the upper end of the frusto-conical wheel is shown with auxiliary spaces 16 and auxiliary teeth 17 interposed in front. In the case of one quarter of the circumference, one space 8 and one tooth 9 are shown in full lines without auxiliary teeth and spaces, auxiliary teeth 17 and spaces 16 being shown in dot and dash lines. An auxiliary space 16 and an auxiliary tooth 17 are shown in plan in Figure 8, from which it will be seen that for constructional reasons the gap 16 is longer than the tooth 17, as otherwise the chain 2 could not move satisfactorily. The same point is illustrated in Figure 10.

What we claim is:—

1. A change-speed gear of continuously variable transmission ratio, comprising a transmission chain shiftable pulley means supporting said chain, two pairs of frusto-conical toothed wheels engaging with the chain, each pair consisting of two wheels engaging with the chain at the same point but on opposite sides of it, the axes of the said two wheels converging and the wheels themselves both tapering in the direction of convergence, but the direction of taper and convergence of one pair being opposite to that of the other pair, and the axial length of the wheels being considerably greater than the breadth of the chain, the generating lines of the two wheels of a pair passing through the same point of engagement with the chain being parallel to one another, the teeth of each of the wheels being opposite to the spaces between the teeth of the other wheel of the pair at the same point of engagement, means for displacing the transmission chain relatively to the wheels in the direction of the parallel generating lines of the wheels.

2. For use in a change-speed gear as claimed in claim 1, a transmission chain consisting of a pair of guides, and thin plates so mounted between the guides as to be slidable individually in a direction transverse to the chain, these plates engaging with the wheel teeth in such a way that the teeth on each wheel push the plates into the spaces between the teeth of the other wheel of the same pair.

3. For use in a change-speed gear as claimed in claim 1, a transmission chain consisting of a pair of guides, and thin plates so mounted between the guides as to be slidable individually in a direction transverse to the chain, these plates engaging with the wheel teeth in such a way that the teeth on each wheel push the plates into the spaces between the teeth of the other wheel of the same pair, and the plates being formed with recesses in their edges in which the guides engage so that the transverse displacement of each plate in either direction is limited by the end of the recess coming into contact with the guide.

4. For use in a change-speed gear as claimed in claim 1, a transmission chain consisting of a pair of parallel guides, each consisting of a number of rigid links pivoted together, thin plates so mounted between the guides as to be slidable individually in a direction transverse to the chain, these plates engaging with the wheel teeth in such a way that the teeth on each wheel push the plates into the spaces between the teeth of the other wheel of the same pair some of the plates being formed with recesses in their edges in which the guides engage and the remainder of the plates being formed with slots near their edges through which the guides pass, so that the transverse displacement of each plate in either direction is limited by the ends of the recesses and the ends of the slots coming into contact with the guide.

ALFRED BACK.
JOSEF KRAUTSCHNEIDER.